US011868932B2

(12) United States Patent
Zhou et al.

(10) Patent No.: US 11,868,932 B2
(45) Date of Patent: Jan. 9, 2024

(54) REAL-TIME OPPORTUNITY DISCOVERY FOR PRODUCTIVITY ENHANCEMENT

(71) Applicant: International Business Machines Corporation, Armonk, NY (US)

(72) Inventors: Nianjun Zhou, Chappaqua, NY (US); Dharmashankar Subramanian, White Plains, NY (US); WingHang Crystal Lui, Alberta (CA)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/037,850

(22) Filed: Sep. 30, 2020

(65) Prior Publication Data

US 2022/0101225 A1    Mar. 31, 2022

(51) Int. Cl.
*G06Q 10/06*       (2023.01)
*G06Q 10/0631*     (2023.01)
(Continued)

(52) U.S. Cl.
CPC ....... *G06Q 10/06312* (2013.01); *G06N 3/049* (2013.01); *G06Q 10/06375* (2013.01)

(58) Field of Classification Search
CPC .................................................... G06Q 10/06
See application file for complete search history.

(56) References Cited

U.S. PATENT DOCUMENTS

| 4,117,343 A | 9/1978 | Hoffeins |
| 4,211,089 A | 7/1980 | Mueller et al. |

(Continued)

FOREIGN PATENT DOCUMENTS

| CN | 1339659 A | 3/2002 |
| CN | 105388876 A | 3/2016 |

(Continued)

OTHER PUBLICATIONS

Schmidt et al., Recent advances and applications of machine learning in solidstate materials science, NPJ Computational Materials, Aug. 8, 2019. (Year: 2019).*

(Continued)

*Primary Examiner* — Kurtis Gills
(74) *Attorney, Agent, or Firm* — Stephen R. Yoder; Jared L. Montanaro (57) ABSTRACT

In an approach for real-time opportunity discovery for productivity enhancement of a production process, a processor extracts a set of features from time series data, through autoencoding using a neural network, based on non-control variables for the time series data. A processor identifies one or more operational modes based on the extracted features including a dimensional reduction with a representation learning from the time series data. A processor identifies a neighborhood of a current operational state based on the extracted features. A processor compares the current operational state to historical operational states based on the time series data at the same operational mode. A processor discovers an operational opportunity based on the comparison of the current operational state to the historical operational states using the neighborhood. A processor identifies control variables in the same mode which variables are relevant to the current operational state.

18 Claims, 5 Drawing Sheets

(51) Int. Cl.
*G06Q 10/0637* (2023.01)
*G06N 3/049* (2023.01)

(56) References Cited

U.S. PATENT DOCUMENTS

| | | | |
|---|---|---|---|
| 6,075,569 | A | 6/2000 | Lee et al. |
| 6,609,036 | B1 | 8/2003 | Bickford |
| 6,671,570 | B2 | 12/2003 | Schulze |
| 7,802,618 | B2 | 9/2010 | Simon et al. |
| 7,848,831 | B2 | 12/2010 | Wang |
| 7,962,472 | B2 | 6/2011 | Erickson et al. |
| 10,140,253 | B2 | 11/2018 | Blevins et al. |
| 10,241,887 | B2 * | 3/2019 | Poghosyan ......... G06F 11/3452 |
| 2004/0117766 | A1 * | 6/2004 | Mehta ................. G05B 11/32 717/121 |
| 2006/0224254 | A1 | 10/2006 | Rumi et al. |
| 2007/0142935 | A1 | 6/2007 | Danielsson |
| 2008/0140246 | A1 | 6/2008 | Kang |
| 2012/0016824 | A1 * | 1/2012 | Kalinkin ............... G01M 15/14 706/12 |
| 2012/0250517 | A1 | 10/2012 | Saarimaki et al. |
| 2013/0246860 | A1 * | 9/2013 | Callan ................. G05B 23/0229 714/47.1 |
| 2014/0197316 | A1 * | 7/2014 | Kadali ................. G01N 21/3577 250/339.11 |
| 2015/0026107 | A1 | 1/2015 | Vijayaraghavan et al. |
| 2015/0316904 | A1 | 11/2015 | Govindanaraj et al. |
| 2018/0087359 | A1 * | 3/2018 | Conn ................... E21B 41/0092 |
| 2019/0056722 | A1 | 2/2019 | Abbaszadeh |
| 2019/0180165 | A1 | 6/2019 | Vinyals et al. |
| 2019/0303143 | A1 | 10/2019 | Beard |
| 2019/0311273 | A1 | 10/2019 | Cohen |
| 2019/0339688 | A1 | 11/2019 | Cella |
| 2019/0369604 | A1 | 12/2019 | Michalschek et al. |
| 2019/0384255 | A1 | 12/2019 | Krishnaswamy |
| 2020/0033316 | A1 * | 1/2020 | Long ....................... B03D 1/02 |
| 2020/0150634 | A1 | 5/2020 | Gray |
| 2021/0026314 | A1 * | 1/2021 | Phan ................... G05B 13/0265 |
| 2021/0064983 | A1 | 3/2021 | Mai |
| 2021/0110487 | A1 | 4/2021 | Nianjun |
| 2022/0011760 | A1 * | 1/2022 | Zhou ...................... G05B 13/04 |

FOREIGN PATENT DOCUMENTS

| | | |
|---|---|---|
| CN | 105930955 A | 9/2016 |
| CN | 106529800 A | 3/2017 |
| CN | 106529820 A | 3/2017 |
| CN | 108242411 A | 7/2018 |
| CN | 108345726 A | 7/2018 |
| CN | 109800483 A | 5/2019 |
| KR | 101527080 B1 | 5/2015 |
| WO | WO-2016040085 A1 * | 3/2016 ......... G05B 23/0229 |
| WO | 2019246008 A1 | 12/2019 |
| WO | 2020023998 A1 | 2/2020 |
| WO | 2022068779 A1 | 4/2022 |

OTHER PUBLICATIONS

Chu et al., "Fault Detection and Operation Mode Identification Based on Pattern Classification with Variable Selection", Industrial Engineering Chemical Research, vol. 43, pp. 1701-1710.

Le, Quoc V., "A Tutorial on Deep Learning Part 2: Autoencoders, Convolutional Neural Networks and Recurrent Neural Networks", Google Brain, Google Inc., Oct. 2015, 20 pages, <http://robotics.stanford.edu/~quocle/tutorial2.pdf>.

Saurav et al., "Online Anomaly Detection with Concept Drift Adaptation using Recurrent Neural Networks", Proceedings of the ACM India Joint International Conference on Data Science and Management of Data—CoDS-COMAD'18, Jan. 11-13, 2018, Goa India, 10 pages.

Wong et al., "Recurrent Auto-Encoder Model for Large-Scale Industrial Sensor Signal Analysis", Jul. 2018, 12 pages, <https://arxiv.org/pdf/1807.03710>.

Zhou et al., "Generating Mode Change Alerts With Automatic Detection From Sensor Data", U.S. Appl. No. 16/599,505, filed Oct. 11, 2019, 31 pages.

IBM, "List of Patent Applications Treated as Related", 2 pages, Filed Herewith.

Eggels et al., "Clustering based collocation for uncertainty propagation with multivariate dependent inputs", 28 pages, (Year: 2017).

Guyon et al., "Model Selection: Beyond the Bayesian/ Frequentist Divide", Journal of Machine Learning Research 11 (2010), pp. 61-87 (Year: 2010).

International Searching Authority, Patent Cooperation Treaty PCT, Notification of Transmittal of the International Search Report and the Written Opinion of the International Searching Authority, or the Declaration, dated Dec. 29, 2021(Dec. 29, 2021), International application No. PCT/CN2021/121060, 10 pages.

Khodabakhsh et al., "Multivariate Sensor Data Analysis for Oil Refineries and Multi-mode Identification of System Behavior in Real-time", IEEE, Oct. 22, 2018, 17 pages (Year: 2018).

Kresta, Jim, "Advanced Process Control of Extraction: Sensors and Models", Paper presented at the SPE International Heavy Oil Symposium, Calgary, Alberta, Canada, Jun. 1995, 14 pages, (Year: 1995).

Rezvani et al., "Lagrangian-Based Pattern Extraction for Edge Computing in the Internet of Things", 2019 6th IEEE International Conference on Cyber Security and Cloud Computing (CSCloud)/ 2019 5th IEEE International Conference on Edge Computing and Scalable Cloud, Date of Conference: Jun. 21-23, 2019, 6 pages, (Year: 2019).

* cited by examiner

REAL-TIME OPPORTUNITY DISCOVERY FOR PRODUCTIVITY ENHANCEMENT

BACKGROUND

The present disclosure relates generally to the field of machine learning, and more particularly to real-time opportunity discovery for productivity enhancement of a production process using historical data encoding.

Many production processes may be quite complex. For example, in an oil sand production, the mined ore may pass through several stages of extraction, upgrading, and refinement. Similar processes can be found in food and steelmaking production processes. The outflow from an upstream process may become an inflow into a downstream process. Each stage may involve multiple components and processes, and the system is a dynamic system. For an oil sand process, in a typical configuration, operation performs at full capacity when enough raw material is available from mining and all of the components are functioning properly. An upgrading process operation may be performed without a vacuum process. A low production mode may result when a quality of bitumen from processed oil sand is low (e.g., with a high concentration of chloride) to avoid degradation of a coking unit. Operation in partial capability may occur when a raw material train line is undergoing maintenance. A low production mode may result when a quality of bitumen from processed oil sand is low (e.g., with a high concentration of chloride) to avoid degradation of a coking unit. Operation in partial capability may occur when a raw material train line is undergoing maintenance.

Traditionally, a majority of bitumen produced is upgraded into synthetic crude oil before being sold to refineries on the market. However, some bitumen is good enough to send directly to a high-conversion refinery that has the ability to process heavy/sour crude oil. Such diluted bitumen example that is sold directly to the refineries includes product from in-situ facilities and other places. Petroleum products may be produced from oil sands through three basic steps: i) extraction of the bitumen from the oil sands, where the solids and water are removed, ii) upgrading of the heavy bitumen to a lighter, intermediate crude oil product, and iii) refining of the crude oil into final products such as gasoline, lubricants and diluents. All of these processes involve multiple sequence steps of physical or chemical transformation to convert from one material to another. An optimal balance of processes is needed to reach multiple objectives within such production system. There is a need for a plant operator to seek opportunities to enhance productivity, for example, less raw materials, less expensive additives, higher final product. There is a further need to focus on specific areas with a high business value to provide an incremental value in a local step of manufacturing process. There is yet another need to discover opportunities for cost, raw material, and energy saving models and help gain additional profit increasing limited to a local step of an overall plant operation with the opportunities within relative short time windows in a manufacturing process.

SUMMARY

Certain shortcomings of the prior art are overcome, and additional advantages are provided through the provision of an approach for real-time opportunity discovery for productivity enhancement of a production process. Advantageously, a processor extracts a set of features from time series data, through autoencoding using a neural network, based on non-control variables for the time series data. A processor identifies one or more operational modes based on the extracted features including a dimensional reduction with a representation learning from the time series data. A processor identifies a neighborhood of a current operational state based on the extracted features. A processor compares the current operational state to historical operational states based on the time series data at the same operational mode. A processor discovers an operational opportunity based on the comparison of the current operational state to the historical operational states using the neighborhood. A processor identifies control variables in the same mode which variables are relevant to the current operational state. A processor recommends an action strategy based on the one or more control variables, the one or more non-control variables, and a target productivity.

In one or more embodiments, a computer-implemented method is provided to monitor time series data generated from one or more sensors. For example, the time series data can be data from an oil sand operation and production process. Petroleum products may be produced from oil sands through several stages, e.g., extraction, upgrading, and refinement. Advantageously, an optimal balance of processes is provided to reach multiple objectives within such production system.

In one or more embodiments, a computer-implemented method is provided to extract a set of features from the time series data, through autoencoding using a neural network, e.g., a LSTM auto-encoder, based on one or more non-control variables for the time series data. Advantageously, the LSTM auto-encoder not only uses the set of features for learning, but also learns the set of features through the LSTM auto-encoder. The set of features are information related to the time series data. The set of features may be an individual measurable property or characteristic of a phenomenon being observed from the time series data. An opportunity discovery module may select a subset of relevant features for creating a prediction model based on the non-control variables defining a lack of control by a user on the time series data. Advantageously, the opportunity discovery module may reduce the number of resources required to describe the time series data. The opportunity discovery module may construct combinations of the non-control variables describing the time series data with sufficient accuracy through the LSTM auto-encoder. Advantageously, the LSTM auto-encoder may invoke the time series data based auto encoding process to reduce dimensions of a sensor tag spaces to limited embedding space.

In one or more embodiments, a computer-implemented method is provided to identify one or more operational modes based on the extracted features including dimension reduction with representation learning from the time series data. Advantageously, dimension reduction is a transformation of the time series data from a high-dimensional space into a low-dimensional space so that the low-dimensional representation retains some meaningful properties of the original data, ideally close to the intrinsic dimension. Advantageously, a neighborhood may be identified for the current operational state. The neighborhood may be a dynamic mode within the same operational mode and may be found through Euclidean distances between the historical operational state and the current operational state. Advantageously, rather than relying on a rule-based mode detection that requires lots of prior knowledge and stored principles, an automatic process is provided. The opportunity discovery module may achieve an opportunity realization through analysis using unsupervised machine learning. For example, the opportunity discovery module may identify an operational opportunity through the comparison of the current state with the historical similar operations inside the mode or neighborhood.

In one or more embodiments, a computer-implemented method is provided to compare a current operational state to a historical operational state based on the time series data at a same operational mode of the one or more operational modes with the opportunity discovery module. Advantageously, the opportunity discovery module may identify a specific mode where the current operational state resides. The opportunity discovery module may project clusters using t-distributed stochastic neighbor embedding (t-SNE) compression to generate a graph. The opportunity discovery module may embed high-dimensional points in low dimensions in a way that respects similarities between points with the t-SNE compression. In an example, the opportunity discovery module may achieve a high bitumen extraction by comparing the current operational state with other operations located at a same mode. The opportunity discovery module may analyze episodes with poor performance and may discover an operational opportunity to improve.

In one or more embodiments, a computer-implemented method is provided to discover an operational opportunity based on the comparison of the current operational state to the historical operational state. Advantageously, the operational opportunity may be identified through the comparison of the current state with the historical similar operations inside the mode or neighborhood. In an example, the operational opportunity may be a set of operational changes deduced from the historical operational state to increase the current operational state into a higher production in a defined short-term future period, for example, in a two-hour window. In another example, the operational opportunity may be a set of operational changes deduced from the historical operational state to reduce the current operational state into a low usage of additives or raw materials in a defined short-term future period. Other suitable opportunities are possible to be found.

In one or more embodiments, a computer-implemented method is provided to identify control variables in the same mode which variables are relevant to the current operational state. Advantageously, the control variables can be used to calculate rewards (or opportunities) from the episodes of the time series data. For example, the control variables may be production rates and raw material variables that the user can optimize based on the best neighboring episodes found. The control variables may be identified from an established neighborhood of similar historical non-control variables to create possible action strategies that are relevant to the current state based on the time series data.

In one or more embodiments, a computer-implemented method is provided to recommend an action strategy based on the control variables, the non-control variables, and a target productivity. Advantageously, a similarity measurement may be defined to identify historical episodes from the time series data, with a similar operational state based on the comparison of the current state with the historical operational state. An episode may be created from the historical episodes that demonstrate a higher productivity or throughput. Scores may be generated based on alternative action strategies and may be used to recommend an action strategy based on the scoring for each alternative action strategy.

In one or more embodiments, a computer-implemented method is provided to output an action strategy for a user. Advantageously, a neighborhood episode using a time-stamped chart may be presented in a user interface. An estimated gain of the action strategy may be presented.

In another aspect, a computer program product is provided which includes one or more computer readable storage media, and program instructions collectively stored on the one or more computer readable storage media. Advantageously, program instructions extract a set of features from time series data, through autoencoding using a neural network, based on non-control variables for the time series data. Program instructions identify one or more operational modes based on the extracted features including a dimensional reduction with a representation learning from the time series data. Program instructions identify a neighborhood of a current operational state based on the extracted features. Program instructions compare the current operational state to historical operational states based on the time series data at the same operational mode. Program instructions discover an operational opportunity based on the comparison of the current operational state to the historical operational states using the neighborhood. Program instructions identify control variables in the same mode which variables are relevant to the current operational state. Program instructions recommend an action strategy based on the one or more control variables, the one or more non-control variables, and a target productivity.

In a further aspect, a computer system is provided which includes one or more computer processors, one or more computer readable storage media, and program instructions stored on the one or more computer readable storage media for execution by at least one of the one or more computer processors. Advantageously, program instructions extract a set of features from time series data, through autoencoding using a neural network, based on non-control variables for the time series data. Program instructions identify one or more operational modes based on the extracted features including a dimensional reduction with a representation learning from the time series data. Program instructions identify a neighborhood of a current operational state based on the extracted features. Program instructions compare the current operational state to historical operational states based on the time series data at the same operational mode. Program instructions discover an operational opportunity based on the comparison of the current operational state to the historical operational states using the neighborhood. Program instructions identify control variables in the same mode which variables are relevant to the current operational state. Program instructions recommend an action strategy based on the one or more control variables, the one or more non-control variables, and a target productivity.

Additional features and advantages are realized through the techniques of the present invention. Other embodiments and aspects of the invention are described in detail herein and are considered a part of the claimed invention.

DETAILED DESCRIPTION

The present disclosure is directed to systems and methods for real-time opportunity discovery for productivity enhancement of a production process using historical data encoding.

Embodiments of the present disclosure recognize a need for a plant operator to seek opportunities to enhance productivity, for example, less raw materials, less expensive additives, higher final product. Embodiments of the present disclosure may focus on specific areas with a high business value to provide an incremental value in a local step of manufacturing process. Embodiments of the present disclosure may discover opportunities for cost, raw material, and energy saving models. The opportunities may have relative short time windows. Embodiments of the present disclosure may help gain additional profit increasing limited to a local step of an overall plant operation. Embodiments of the present disclosure may select a complete set of time series from sensors, e.g., Internet of things (IoT) sensors, such that the time series have a complete picture of the plant status. Embodiments of the present disclosure may separate the time series into control and non-control variables. In a production process, embodiments of the present disclosure may dynamically provide recommendation and suggestion on enhancing productivities through less raw material consumption, less expensive additive usage, less energy consumption, and higher product output. Embodiments of the present disclosure may derive more timely and accurate opportunities in a window of only a few hours. Embodiments of the present disclosure may find an operational mode and neighborhood using extracted features as embedded space utilizing autoencoding techniques. The autoencoding techniques may achieve the time-series dimension reduction and generate production recommendations from the historical similarity analysis in the mode or neighborhood in an embedded space.

Embodiments of the present disclosure may apply a long short-term memory (LSTM) auto-encoder to extract the feature or embedded space for non-control variables. Embodiments of the present disclosure may define the neighborhood or use Gaussian mixture clustering applied to an embedded space to identify static operational modes. Embodiments of the present disclosure disclose identifying the neighborhood for the current operational state. The neighborhood may be a dynamic mode within the same operational mode and may be found through Euclidean distances between the historical operational state and the current operational state. Embodiments of the present disclosure may identify opportunities through the identification of improvement recommendation by looking at the difference of the control variables. Embodiments of the present disclosure may compare the current operational state with other operations located at the same mode. The poor episodes with poor performance give an opportunity to improve. Embodiments of the present disclosure may limit historical episodes by selecting the neighborhood of the current operational state. Embodiments of the present disclosure may perform verification of the completion of the time series data for the performance accuracy of a prediction model developed using all the control and non-control variables.

Figure 1:
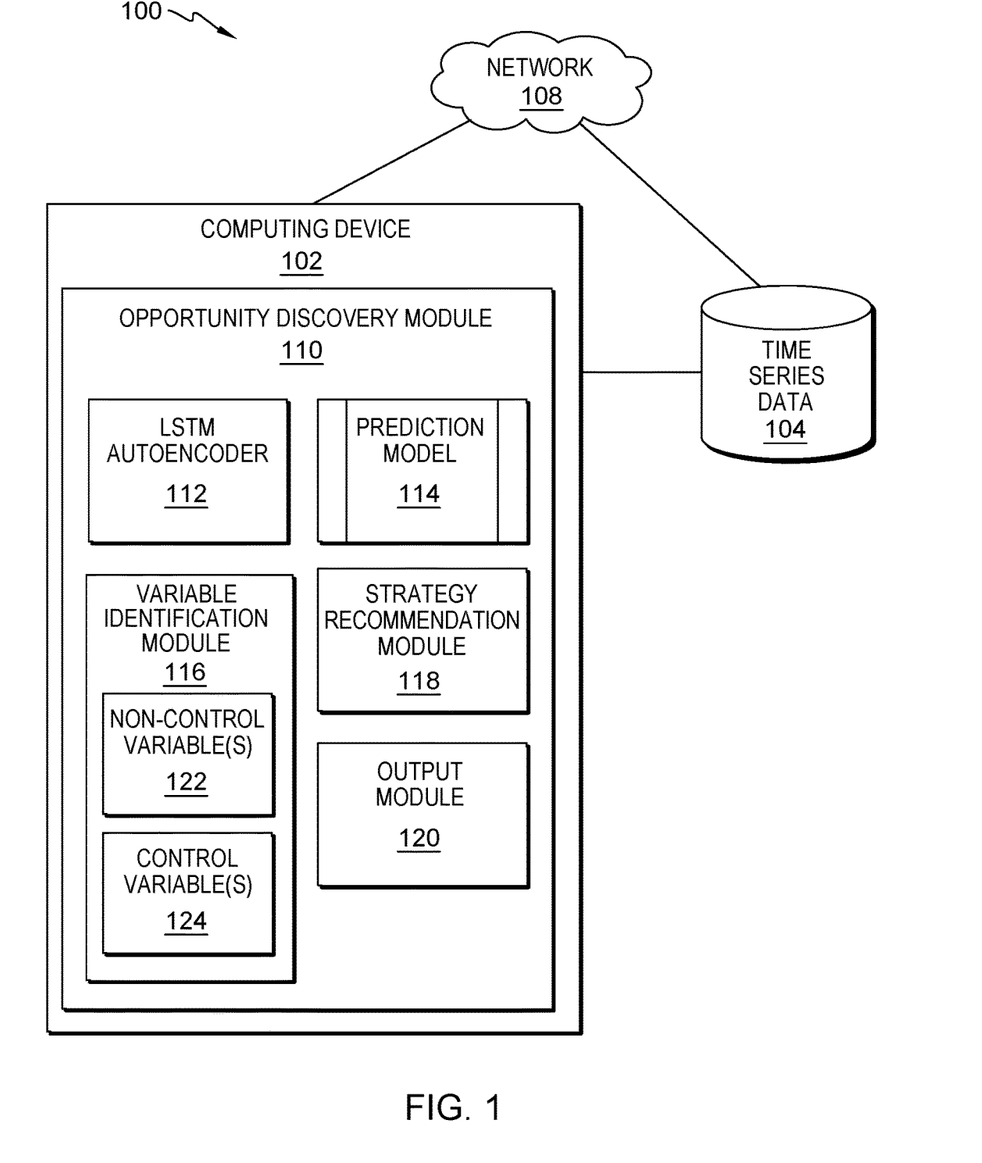
FIG. 1 is a functional block diagram illustrating an operation opportunity discovery environment, in accordance with an embodiment of the present disclosure.

The present disclosure will now be described in detail with reference to the Figures. FIG. 1 is a functional block diagram illustrating an operation opportunity discovery environment, generally designated 100, in accordance with an embodiment of the present disclosure.

In the depicted embodiment, operation opportunity discovery environment 100 includes computing device 102, time series data 104, and network 108. In an embodiment, time series data 104 may be accessed directly by computing device 102. In another embodiment, time series data 104 may be accessed through a communication network such as network 108. In one or more embodiments, time series data 104 may be data captured by one or more sensors. For example, time series data 104 can be data from an oil sand operation and production process. In the example of the oil sand operation and production process, some bitumen may be upgraded into synthetic crude oil before being sold to refineries. Some bitumen may be good enough to be delivered to a high-conversion refinery that can process heavy crude oil. Petroleum products may be produced from oil sands through several stages, e.g., extraction, upgrading, and refinement. For example, solid and water may be removed during the extraction stage which may extract bitumen from the oil sands. During the upgrading stage, bitumen may be upgraded to a lighter, intermediate crude oil product. During the refinement stage, crude oil may be refined into final products such as gasoline, lubricants and diluents. The processes during the stages may involve multiple sequence steps of physical or chemical transformation to convert from one material to another. An optimal balance of processes is needed to reach multiple objectives within such production system.

In another example, time series data 104 can be data from a steelmaking process of producing steel from iron ore and/or scrap. Impurities such as nitrogen, silicon, phosphorus, sulfur and excess carbon may be removed from the sourced iron, and alloying elements such as manganese, nickel, chromium, carbon and vanadium may be added to produce different grades of steel. In yet another example, time series data 104 can be data from a production process which may process soybeans into soy sauces with additives added to the soy sauces. In yet another example, time series data 104 can be data from any other suitable operation and production process.

In one or more embodiments, time series data 104 can be data, for example, including non-control variables 122 and control variables 124. Non-control variables 122 and control variables 124 may be separated to ensure the ability to take action to gain production enhancement opportunities. For example, non-control variables 122 may be time-stamped variables and be defined as a set of variables from sensors which users have little to no control over. Non-control variables 122 may be parameters that are used to define how similar operation and production conditions are. Non-control variables 122 may retrieve episodes from time series data 104. Control variables 124 may be time-stamped variables and be defined as a set of variables from sensors for actions that can be controlled by a user. In an example, control variables 124 can be used to calculate rewards (or opportunities) from the episodes of time series data 104. Control variables 124 may be production rates and raw material variables that the user can optimize based on the best neighboring episodes found. Control variables 124 may be identified from an established neighborhood of similar historical non-control variables 122 to create possible action strategies that are relevant to the current state based on time series data 104.

In a froth production example, non-control variables 122 may be environmental variables that a user may have little or no control over, for example, environmental temperatures, flash, cloud, viscosity, hydrogen availability, coker rate, and virgin production. Control variables 124 may be variables for actions that can be controlled by a user, for example, production rates and raw material variables that a user can optimize or change. Control variables 124 may include, for example, charge into diesel hydrotreating or catalytic hydrogen treating, feedslate into diesel hydrotreating with low vacuum gas oil, low vacuum gas oil, side draw kerosene, heavy naphtha, and coker kerosene. Diesel hydrotreating or catalytic hydrogen treating may be mainly to reduce undesirable species from straight-run diesel fraction by selectively reacting these species with hydrogen in a reactor at elevated temperatures and at moderate pressures. In order to successfully produce ultra-low-sulfur diesel, organo-sulfur species need to be removed including the substituted dibenzothiophenes and other refractory sulfur species. Multiple reactions may occur in parallel on the diesel hydrotreating catalyst surface including hydrodesulfurization, hydrodenitrogenation, and aromatic saturation/hydrogenation. Feeds for a diesel hydrotreating unit may have a nominal distillation range of 300-700° F. Different process design and flow schemes can be employed for diesel hydrotreating depending on the process objectives and characteristics of the feed being processed.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to opportunity discovery module 110 and network 108 and is capable of processing program instructions and executing opportunity discovery module 110, in accordance with an embodiment of the present disclosure. Computing device 102 may include internal and external hardware components, as depicted and described in further detail with respect to FIG. 5.

Further, in the depicted embodiment, computing device 102 includes opportunity discovery module 110. In the depicted embodiment, opportunity discovery module 110 is located on computing device 102. However, in other embodiments, opportunity discovery module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and opportunity discovery module 110, in accordance with a desired embodiment of the disclosure.

In the depicted embodiment, opportunity discovery module 110 includes LSTM auto-encoder 112, prediction model 114, variable identification module 116, strategy recommendation module 118 and output module 120. In the depicted embodiment, LSTM auto-encoder 112, prediction model 114, variable identification module 116, strategy recommendation module 118 and output module 120 are located on computing device 102. However, in other embodiments, LSTM auto-encoder 112, prediction model 114, variable identification module 116, strategy recommendation module 118 and output module 120 may be located externally and accessed through a communication network such as network 108.

In one or more embodiments, opportunity discovery module 110 is configured to monitor time series data 104 generated from one or more sensors. For example, time series data 104 can be data from an oil sand operation and production process. Petroleum products may be produced from oil sands through several stages, e.g., extraction, upgrading, and refinement. For example, solid and water may be removed during the extraction stage which may extract bitumen from the oil sands. During the upgrading stage, bitumen may be upgraded to a lighter, intermediate crude oil product. During the refinement stage, crude oil may be refined into final products such as gasoline, lubricants and diluents. The processes during the stages may involve multiple sequence steps of physical or chemical transformation to convert from one material to another. An optimal balance of processes is needed to reach multiple objectives within such production system. In another example, time series data 104 can be data from a steelmaking process of producing steel from iron ore and/or scrap. Impurities such as nitrogen, silicon, phosphorus, sulfur and excess carbon may be removed from the sourced iron, and alloying elements such as manganese, nickel, chromium, carbon and vanadium may be added to produce different grades of steel. In yet another example, time series data 104 can be data from a production process which may process soybeans into soy sauces with additives added to the soy sauces. In yet another example, time series data 104 can be data from any other suitable operation and production process.

In one or more embodiments, opportunity discovery module 110 is configured to extract a set of features from time series data 104, through a recurrent neural network, e.g., LSTM auto-encoder 112, based on one or more non-control variables 122 for time series data 104. Opportunity discovery module 110 may not only use the set of features for learning, but also learn the set of features through LSTM auto-encoder 112. The set of features are information related to time series data 104. The set of features may be an individual measurable property or characteristic of a phenomenon being observed from time series data 104. Opportunity discovery module 110 may select a subset of relevant features for creating prediction model 114 based on non-control variables 122 defining no control by a user on time series data 104. Opportunity discovery module 110 may reduce the number of resources required to describe time series data 104. Opportunity discovery module 110 may construct combinations of non-control variables 122 describing time series data 104 with sufficient accuracy through LSTM auto-encoder 112. LSTM auto-encoder 112 may be an artificial neural network used to learn efficient data coding in an unsupervised manner. LSTM auto-encoder 112 may be a recurrent neural network with an implementation of an autoencoder for time series data 104 using an encoder-decoder LSTM architecture. LSTM auto-encoder 112 may learn a representation (encoding) for time series data 104, e.g., for dimensionality reduction. LSTM autoencoder 112 may generate from the reduced encoding a representation as close as possible to the original input of time series data 104. LSTM auto-encoder 112 may include an encoder and a decoder. The encoder may use raw data (e.g., time series data 104) as input and produce feature or representation as output, and the decoder uses the extracted feature from the encoder as input and reconstructs the original input raw data as output. Training can be repeated until some stopping criteria are satisfied. LSTM auto-encoder 112 may invoke time series data 104 based auto encoding process to reduce dimensions of a sensor tag spaces to limited embedding space. LSTM auto-encoder 112 may invoke a clustering method to generate potential modes. LSTM auto-encoder 112 may invoke a type of artificial neural network used to learn efficient data coding in an unsupervised manner. LSTM auto-encoder 112 may get a fixed sized vector from time series data 104.

In one or more embodiments, opportunity discovery module 110 is configured to identify one or more operational modes based on the extracted features including dimension reduction with representation learning from time series data 104. Dimension reduction may be a transformation of time series data 104 from a high-dimensional space into a low-dimensional space so that the low-dimensional representation retains some meaningful properties of the original data, ideally close to the intrinsic dimension. Opportunity discovery module 110 may identify a neighborhood for the current operational state. The neighborhood may be a dynamic mode within the same operational mode and may be found through Euclidean distances between the historical operational state and the current operational state. Opportunity discovery module 110 may define the neighborhood or use Gaussian mixture clustering applied to embedded to identify static operational modes. A mode may include a status of plant operation. A hard category type of a mode may regard a specific operational configuration of an entire production process, such as manufacturing a pipe configuration, a unit operation status. A soft category type of a mode may include a production level of local or global operations. In the sand oil industry, there is a complex process of converting sand oil into synthesis crude oil. To complete a synthesis crude oil production generation, there are multiple stages involved, including primary extraction, secondary extraction, and upgrading. Each stage involves multiple components and processes, and the system is a dynamic system. Some of the involved modes may be explicitly known by a site engineer. Other modes may be hidden and can be identified through advanced analytic models. Opportunity discovery module 110 may automatically detect an operational mode by learning from historical sensor and other production data and may achieve compact feedback in the form of modes. Opportunity discovery module 110 may determine the operational modes algorithms and models. Opportunity discovery module 110 may use the operational modes as a benchmark if similar production conditions have been present in the past, or if a new mode may be identified. The operational modes may be used to recommend better control actions or to automatically change control parameters. If a new mode is identified, the new mode may be saved to expand the memory and knowledge of the system. Opportunity discovery module 110 may compute historical benchmarking of a detected mode against historical plant data when the plant is in the same mode. Opportunity discovery module 110 may use the detected mode as a basis for identifying the similar time periods from history. For instance, time periods from history may be identified when the same mode was active. Opportunity discovery module 110 may further use factor analysis on the set of process variables that jointly define the detected mode to identify the key difference in terms of the current variable values versus the historical variable values. Opportunity discovery module 110 may compute and display to a site engineer on the possible root cause of the low levels of operation/production. Opportunity discovery module 110 may provide an analytic approach to identify or classify modes over a complex manufacture process. Opportunity discovery module 110 may provide a detailed or general multivariate mode identification, and as a byproduct, may also achieve a partitioning of un-partitioned data into several subsets. Rather than relying on a rule-based mode detection that requires lots of prior knowledge and stored principles, opportunity discovery module 110 may provide an automatic process, providing a simpler human involvement approach to generate modes. Opportunity discovery module 110 may achieve an opportunity realization through analysis using unsupervised machine learning. For example, opportunity discovery module 110 may identify an operational opportunity through the comparison of the current state with the historical similar operations inside the mode or neighborhood.

In one or more embodiments, opportunity discovery module 110 is configured to compare a current operational state to a historical operational state based on the time series data at a same operational mode of the one or more operational modes. Opportunity discovery module 110 may identify a specific mode where the current operational state resides. Opportunity discovery module 110 may project clusters using t-distributed stochastic neighbor embedding (t-SNE) compression to generate a graph. The t-SNE is an algorithm for dimensionality reduction that is suited to visualizing high-dimensional data, e.g., time series data 104. Opportunity discovery module 110 may embed high-dimensional points in low dimensions in a way that respects similarities between points with the t-SNE compression. In an example, opportunity discovery module 110 may achieve a high bitumen extraction by comparing the current operational state with other operations located at a same mode. Opportunity discovery module 110 may analyze episodes with poor performance and may discover an operational opportunity to improve. Opportunity discovery module 110 may focus on these operation episodes in the history reached a high froth production and may extract key operation actions from these episodes to help the current operation.

In one or more embodiments, opportunity discovery module 110 is configured to discover an operational opportunity based on the comparison of the current operational state to the historical operational state. The operational opportunity may be identified through the comparison of the current state with the historical similar operations inside the mode or neighborhood. In an example, the operational opportunity may be a set of operational changes deduced from the historical operational state to increase the current operational state into a higher production in a defined short-term future period, for example, in a two-hour window. In another example, the operational opportunity may be a set of operational changes deduced from the historical operational state to reduce the current operational state into a low usage of additives or raw materials in a defined short-term future period. Other suitable opportunities are possible to be found.

In one or more embodiments, opportunity discovery module 110 is configured to identify control variables 124 in the same mode which variables are relevant to the current operational state. Control variables 124 may define actions that can be controlled by a user. Control variables 124 may be time-stamped variables and can be defined as a set of variables from sensors for actions that can be controlled by a user. In an example, control variables 124 can be used to calculate rewards (or opportunities) from the episodes of time series data 104. For example, control variables 124 may be production rates and raw material variables that the user can optimize based on the best neighboring episodes found. Control variables 124 may be identified from an established neighborhood of similar historical non-control variables 122 to create possible action strategies that are relevant to the current state based on time series data 104. In a froth production example, control variables 124 may include, for example, charge into diesel hydrotreating or catalytic hydrogen treating, feedslate into diesel hydrotreating with low vacuum gas oil, low vacuum gas oil, side draw kerosene, heavy naphtha, and coker kerosene. Diesel hydrotreating or catalytic hydrogen treating may be mainly to reduce undesirable species from straight-run diesel fraction by selectively reacting these species with hydrogen in a reactor at elevated temperatures and at moderate pressures. In order to successfully produce ultra-low-sulfur diesel, organo-sulfur species need to be removed including the substituted dibenzothiophenes and other refractory sulfur species. Multiple reactions may occur in parallel on the diesel hydrotreating catalyst surface including hydrodesulfurization, hydrodenitrogenation, and aromatic saturation/hydrogenation.

In one or more embodiments, opportunity discovery module 110 is configured to recommend an action strategy based on control variables 124, non-control variables 122, and a target productivity. Opportunity discovery module 110 may define a similarity measurement to identify historical episodes from time series data 104, with a similar operational state based on the comparison of the current state with the historical operational state. Opportunity discovery module 110 may create an episode from the historical episodes that demonstrate a higher productivity or throughput. Opportunity discovery module 110 may generate scores based on alternative action strategies and may recommend an action strategy based on the scoring for each alternative action strategy.

In one or more embodiments, opportunity discovery module 110 is configured to output an action strategy for a user. Opportunity discovery module 110 may provide a user interface to interface with the user. Opportunity discovery module 110 may provide other suitable output ways with the user. Opportunity discovery module 110 may provide an indicator or alert to the user for a discovered operational opportunity. Opportunity discovery module 110 may display the operational modes as a graph using a t-SNE method. Opportunity discovery module 110 may display a neighborhood episode using a time-stamped chart. Opportunity discovery module 110 may display an estimated gain of the action strategy.

In one or more embodiments, LSTM auto-encoder 112 is configured to extract a set of features from time series data 104 based on non-control variables 122 for time series data 104. In an example, LSTM auto-encoder 112 may be an artificial neural network used to learn efficient data coding in an unsupervised manner. LSTM auto-encoder 112 may be capable of automatically extracting effect of past events. LSTM auto-encoder 112 may be a recurrent neural network with an implementation of an autoencoder for time series data 104 using an encoder-decoder LSTM architecture. LSTM auto-encoder 112 may learn a representation (encoding) for time series data 104, e.g., for dimensionality reduction. LSTM auto-encoder 112 may generate from the reduced encoding a representation as close as possible to the original input of time series data 104. LSTM auto-encoder 112 may include an encoder and a decoder. The encoder may use raw data (e.g., time series data 104) as input and may produce feature or representation as output, and the decoder may use the extracted feature from the encoder as input and may reconstruct the original input raw data as output. Training LSTM auto-encoder 112 can be repeated until some stopping criteria are satisfied. LSTM auto-encoder 112 may invoke time series data 104 using auto encoding process to reduce dimensions of a sensor tag spaces to limited embedding space. LSTM auto-encoder 112 may invoke a clustering method to generate potential modes. LSTM auto-encoder 112 may invoke a type of artificial neural network used to learn efficient data coding in an unsupervised manner. LSTM auto-encoder 112 may get a fixed sized vector from time series data 104. LSTM auto-encoder 112 may not only use the set of features for learning, but also learn the set of features itself. The set of features may be information related to time series data 104. The set of features may be an individual measurable property or characteristic of a phenomenon being observed from time series data 104. LSTM auto-encoder 112 may select a subset of relevant features for creating prediction model 114 based on non-control variables 122 defining no control by a user on time series data 104. LSTM auto-encoder 112 may reduce the number of resources required to describe time series data 104. LSTM auto-encoder 112 may construct combinations of non-control variables 122 describing time series data 104 with sufficient accuracy.

In one or more embodiments, prediction model 114 is configured to discover an operational opportunity based on time series data 104. The operational opportunity may be identified through the comparison of the current state with the historical similar operations inside the mode or neighborhood. In an example, the operational opportunity may be a set of operational changes deduced from the historical operational state to increase the current operational state into a higher production in a defined short-term future period. In another example, the operational opportunity may be a set of operational changes deduced from the historical operational state to reduce the current operational state into a low usage of additives or raw materials in a defined short-term future period. Other suitable opportunities are possible to be found.

In one or more embodiments, prediction model 114 is configured to identify one or more operational modes based on the extracted features including a dimensional reduction with a representation learning from time series data 104. Prediction model 114 may identify a neighborhood for the current operational state. The neighborhood may be a dynamic mode within the same operational mode and may be found through Euclidean distances between the historical operational state and the current operational state. Prediction model 114 may define the neighborhood or use Gaussian mixture clustering applied to embedded to identify static operational modes. A mode may include a status of plant operation. In the sand oil industry, there is a complex process of converting sand oil into synthesis crude oil. To complete a synthesis crude oil production generation, there are multiple stages involved, including primary extraction, secondary extraction, and upgrading. Each stage involves multiple components and processes. Some of the involved modes may be explicitly known by a site engineer. Other modes may be hidden and can be identified through advanced analytic models. Prediction model 114 may automatically detect an operational mode by learning from historical sensor and other production data and may achieve compact feedback in the form of modes. Prediction model 114 may use the operational modes as a benchmark if similar production conditions have been present in the past, or if a new mode may be identified. Prediction model 114 may use the operational modes to recommend better control actions or to automatically change control parameters. Prediction model 114 may compute historical benchmarking of a detected mode against historical plant data when the plant lived in the same mode. Prediction model 114 may use the detected mode as a basis for identifying the similar time periods from history. For instance, time periods from history may be identified when the same mode was active. Prediction model 114 may further use factor analysis on the set of process variables that jointly define the detected mode to identify the key difference in terms of the current variable values versus the historical variable values. Prediction model 114 may compute and display to a site engineer on the possible root cause of the low levels of operation/production. Prediction model 114 may provide an automatic process, providing a simpler human involvement approach to generate modes. Prediction model 114 may achieve an opportunity realization through analysis using unsupervised machine learning. For example, prediction model 114 may identify an operational opportunity through the comparison of the current state with the historical similar operations inside the mode or neighborhood. Prediction model 114 may identify a specific mode where the current operational state resides. Prediction model 114 may project clusters using t-SNE compression to generate a graph. T-SNE may be an algorithm for dimensionality reduction that is suited to visualizing high-dimensional data, e.g., time series data 104. Prediction model 114 may embed high-dimensional points in low dimensions in a way that respects similarities between points with the t-SNE compression. In an example, prediction model 114 achieve a high bitumen extraction by comparing the current operational state with other operations located at a same mode. Prediction model 114 may analyze episodes with poor performance and discover an operational opportunity to improve. Prediction model 114 may focus on these operation episodes in the history reached a high froth production and may extract key operation actions from these episodes to help the current operation.

In one or more embodiments, variable identification module 116 is configured to identify non-control variables 122 and control variables 124 from time series data 104. Non-control variables 122 and control variables 124 may be separated to ensure the ability to take action to gain production enhancement opportunities based on time series data 104. For example, non-control variables 122 may be time-stamped variables and may be defined as a set of variables from sensors which users have little to no control over. Non-control variables 122 may be parameters that are used to define how similar operation and production conditions are. Non-control variables 122 may retrieve episodes from time series data 104. Control variables 124 may be time-stamped variables and may be defined as a set of variables from sensors for actions that can be controlled by a user. In an example, control variables 124 can be used to calculate rewards (or opportunities) from the episodes of the time series data. Control variables 124 may be production rates and raw material variables that the user can optimize based on the best neighboring episodes found. Control variables 124 may be identified from an established neighborhood of similar historical non-control variables 122 to create possible action strategies that are relevant to the current state based on time series data 104. In one or more embodiments, variable identification module 116 is configured to identify one or more control variables 124 in the same mode which variables are relevant to the current operational state.

In one or more embodiments, strategy recommendation module 118 is configured to recommend an action strategy based on control variables 124, non-control variables 122, and a target productivity. Strategy recommendation module 118 may define a similarity measurement to identify historical episodes from time series data 104, with a similar operational state based on the comparison of the current state with the historical operational state. Strategy recommendation module 118 may create an episode from the historical episodes that demonstrate a higher productivity or throughput. Strategy recommendation module 118 may generate scores based on alternative action strategies and may recommend the action strategy based on the scoring for each alternative action strategy.

In one or more embodiments, output module 120 is configured to output the action strategy for a user. Output module 120 may provide a user interface to interface with the user. Output module 120 may provide other suitable output ways with the user. Output module 120 may provide an alert to a user for a discovered operational opportunity. Output module 120 may display operational modes using a t-SNE method. Output module 120 may display a neighborhood episode using a time-stamped chart. Output module 120 may display an estimated gain of the action strategy.

Figure 2:
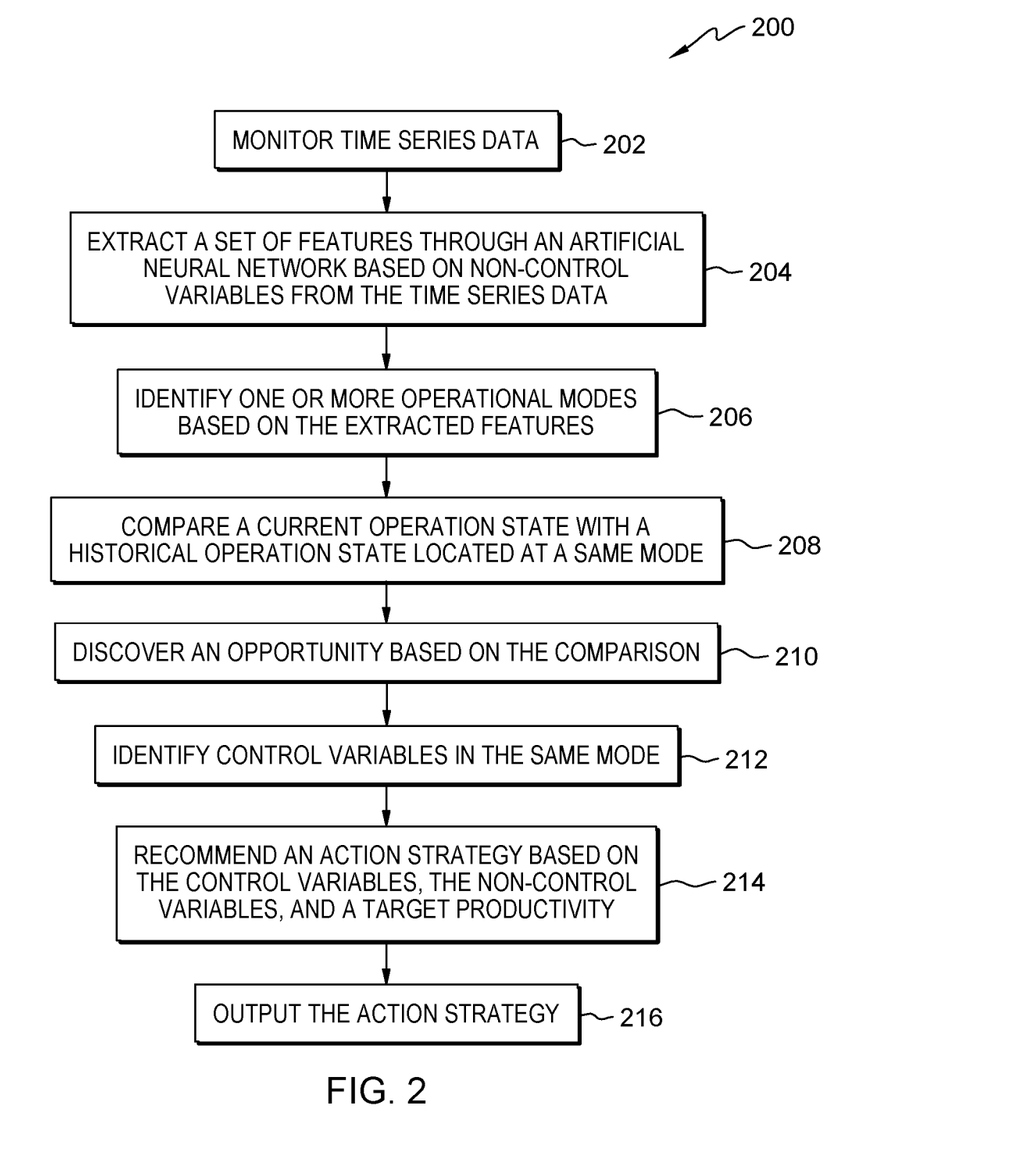
FIG. 2 is a flowchart depicting operational steps of an opportunity discovery module within a computing device of FIG. 1, in accordance with an embodiment of the present disclosure.

FIG. 2 is a flowchart 200 depicting operational steps of opportunity discovery module 110 in accordance with an embodiment of the present disclosure.

Opportunity discovery module 110 operates to monitor time series data 104 generated from one or more sensors. Opportunity discovery module 110 also operates to extract a set of features from time series data 104, through autoencoding using a neural network, e.g., LSTM auto-encoder 112, based on non-control variables 122 for time series data 104. Opportunity discovery module 110 operates to identify one or more operational modes based on the extracted features including a dimensional reduction with a representation learning from time series data 104. Opportunity discovery module 110 operates to compare a current operational state to a historical operational state based on time series data 104 at a same operational mode of the operational modes. Opportunity discovery module 110 operate to discover an operational opportunity based on the comparison of the current operational state to the historical operational state. Opportunity discovery module 110 operates to identify control variables 124 in the same mode which variables are relevant to the current operational state. Opportunity discovery module 110 operates to recommend an action strategy based on control variables 124, non-control variables 122, and a target productivity. Opportunity discovery module 110 operates to outputs the action strategy for a user.

In step 202, opportunity discovery module 110 monitors time series data 104 generated from one or more sensors. For example, time series data 104 can be data from an oil sand operation and production process. Petroleum products may be produced from oil sands through several stages, e.g., extraction, upgrading, and refinement. For example, solid and water may be removed during the extraction stage which may extract bitumen from the oil sands. During the upgrading stage, bitumen may be upgraded to a lighter, intermediate crude oil product. During the refinement stage, crude oil may be refined into final products such as gasoline, lubricants and diluents. The processes during the stages may involve multiple sequence steps of physical or chemical transformation to convert from one material to another. An optimal balance of processes is needed to reach multiple objectives within such production system. In another example, time series data 104 can be data from a steelmaking process of producing steel from iron ore and/or scrap. Impurities such as nitrogen, silicon, phosphorus, sulfur and excess carbon may be removed from the sourced iron, and alloying elements such as manganese, nickel, chromium, carbon and vanadium may be added to produce different grades of steel. In yet another example, the time series data can be data from a production process which may process soybeans into soy sauces with additives added to the soy sauces. In yet another example, the time series data can be data from any other suitable operation and production process.

In step 204, opportunity discovery module 110 extracts a set of features from time series data 104, through autoencoding using a neural network, e.g., LSTM auto-encoder 112, based on one or more non-control variables 122 for time series data 104. Opportunity discovery module 110 may not only use the set of features for learning, but also learn the set of features through LSTM auto-encoder 112. The set of features may be information related to time series data 104. The set of features may be an individual measurable property or characteristic of a phenomenon being observed from time series data 104. Opportunity discovery module 110 may select a subset of relevant features for creating prediction model 114 based on non-control variables 122 defining a lack of control by a user on time series data 104. Opportunity discovery module 110 may reduce the number of resources required to describe time series data 104. Opportunity discovery module 110 may construct combinations of non-control variables 122 describing time series data 104 with sufficient accuracy through LSTM autoencoder 112. LSTM auto-encoder 112 may be an artificial neural network used to learn efficient data coding in an unsupervised manner. LSTM auto-encoder 112 may be a recurrent neural network with an implementation of an autoencoder for time series data 104 using an encoder-decoder LSTM architecture. LSTM auto-encoder 112 may learn a representation (encoding) for time series data 104, e.g., for dimensionality reduction. LSTM auto-encoder 112 may generate from the reduced encoding a representation as close as possible to the original input of time series data 104. LSTM auto-encoder 112 may include an encoder and a decoder. The encoder may use raw data (e.g., time series data 104) as input and may produce feature or representation as output, and the decoder may uses the extracted feature from the encoder as input and may reconstruct the original input raw data as output. Training can be repeated until some stopping criteria are satisfied. LSTM auto-encoder 112 may invoke time series data 104 using auto encoding process to reduce dimensions of a sensor tag space to limited embedding space. LSTM auto-encoder 112 may invoke a clustering method to generate potential modes. LSTM auto-encoder 112 may invoke a type of artificial neural network used to learn efficient data coding in an unsupervised manner. LSTM auto-encoder 112 may get a fixed sized vector from time series data 104.

In step 206, opportunity discovery module 110 identifies one or more operational modes based on the extracted features including a dimensional reduction with a representation learning from time series data 104. Opportunity discovery module 110 may identify a neighborhood for the current operational state. The neighborhood may be a dynamic mode within the same operational mode and may be found through Euclidean distances between the historical operational state and the current operational state. Opportunity discovery module 110 may define the neighborhood or use Gaussian mixture clustering applied to embedded to identify static operational modes. A mode may include a status of plant operation. A hard category type of a mode may regard a specific operational configuration of an entire production process, such as manufacturing a pipe configuration, a unit operation status. A soft category type of a mode may include a production level of local or global operations. In the sand oil industry, there is a complex process of converting sand oil into synthesis crude oil. To complete a synthesis crude oil production generation, there are multiple stages involved, including primary extraction, secondary extraction, and upgrading. Each stage involves multiple components and processes, and the system is a dynamic system. Some of the involved modes may be explicitly known by a site engineer. Other modes may be hidden and can be identified through advanced analytic models. Opportunity discovery module 110 may automatically detect an operational mode by learning from historical sensor and other production data and may achieve compact feedback in the form of modes. Opportunity discovery module 110 may determine the operational mode algorithms and models. Opportunity discovery module 110 may use the operational modes as a benchmark if similar production conditions have been present in the past, or if a new mode may be identified. The operational modes may be used to recommend better control actions or to automatically change control parameters. If a new mode is identified, the new mode may be saved to expand the memory and knowledge of the system. Opportunity discovery module 110 may compute historical benchmarking of a detected mode against historical plant data when the plant is in the same mode. Opportunity discovery module 110 may use the detected mode as a basis for identifying the similar time periods from history. For instance, time periods from history may be identified when the same mode is active. Opportunity discovery module 110 may further use factor analysis on the set of process variables that jointly define the detected mode to identify the key difference in terms of the current variable values versus the historical variable values. Opportunity discovery module 110 may compute and display to a site engineer on the possible root cause of the low levels of operation/production. Opportunity discovery module 110 may provide an analytic approach to identify or classify modes over a complex manufacture process. Opportunity discovery module 110 may provide a detailed or general multivariate mode identification, and as a byproduct, may also achieve a partitioning of un-partitioned data into several subsets. Rather than relying on a rule-based mode detection that requires prior knowledge and stored principles, opportunity discovery module 110 may provide an automatic process, providing a simpler human involvement approach to generate modes. Opportunity discovery module 110 may achieve an opportunity realization through analysis using unsupervised machine learning. For example, opportunity discovery module 110 may identify an operational opportunity through the comparison of the current state with the historical similar operations inside the mode or neighborhood.

In step 208, opportunity discovery module 110 compares a current operational state to a historical operational state based on the time series data at a same operational mode of the one or more operational modes. Opportunity discovery module 110 may identify a specific mode where the current operational state resides. Opportunity discovery module 110 may project clusters using t-SNE compression to generate a graph. In an example, T-SNE may be an algorithm for dimensionality reduction that is suited to visualizing high-dimensional data, e.g., time series data 104. Opportunity discovery module 110 may embed high-dimensional points in low dimensions in a way that respects similarities between points with a t-SNE compression. In an example, opportunity discovery module 110 may achieve a high bitumen extraction by comparing the current operational state with other operations located at a same mode. Opportunity discovery module 110 may analyze episodes with poor performance and may discover an operational opportunity to improve. Opportunity discovery module 110 may focus on these operation episodes in the history reached a high froth production and may extract key operation actions from these episodes to help the current operation.

In step 210, opportunity discovery module 110 discovers an operational opportunity based on the comparison of the current operational state to the historical operational state. The operational opportunity may be identified through the comparison of the current state with the historical similar operations inside the mode or neighborhood. In an example, the operational opportunity may be a set of operational changes deduced from the historical operational state to increase the current operational state into a higher production in a defined short-term future period. In another example, the operational opportunity may be a set of operational changes deduced from the historical operational state to reduce the current operational state into a low usage of additives or raw materials in a defined short-term future period. Other suitable opportunities are possible to be found.

In step 212, opportunity discovery module 110 identifies one or more control variables 124 in the same mode which variables are relevant to the current operational state. Control variables 124 may define actions that can be controlled by a user. Control variables 124 may be time-stamped variables and can be defined as a set of variables from sensors for actions that can be controlled by a user. In an example, control variables 124 can be used to calculate rewards (or opportunities) from the episodes of time series data 104. For example, control variables 124 may be production rates and raw material variables that the user can optimize based on the best neighboring episodes found. Control variables 124 may be identified from an established neighborhood of similar historical non-control variables 122 to create possible action strategies that are relevant to the current state based on time series data 104. In a froth production example, control variables 124 may include, for example, charge into diesel hydrotreating or catalytic hydrogen treating, feedslate into diesel hydrotreating with low vacuum gas oil, low vacuum gas oil, side draw kerosene, heavy naphtha, and coker kerosene.

In step 214, opportunity discovery module 110 recommends an action strategy based on control variables 124, non-control variables 122, and a target productivity. Opportunity discovery module 110 may define a similarity measurement to identify historical episodes from time series data 104, with a similar operational state based on the comparison of the current state with the historical operational state. Opportunity discovery module 110 may create an episode from the historical episodes that demonstrate a higher productivity or throughput. Opportunity discovery module 110 may generate scores based on alternative action strategies and may recommend the action strategy based on the scoring for each alternative action strategy.

In step 216, opportunity discovery module 110 outputs the action strategy for a user. Opportunity discovery module 110 may provide a user interface to interface with the user. Opportunity discovery module 110 may provide other suitable output ways with the user. Opportunity discovery module 110 may indicate a signal for the discovered operational opportunity. Opportunity discovery module 110 may display the operational modes using a t-SNE method. Opportunity discovery module 110 may display a neighborhood episode using a time-stamped chart. Opportunity discovery module 110 may display an estimated gain of the action strategy.

Figure 3:
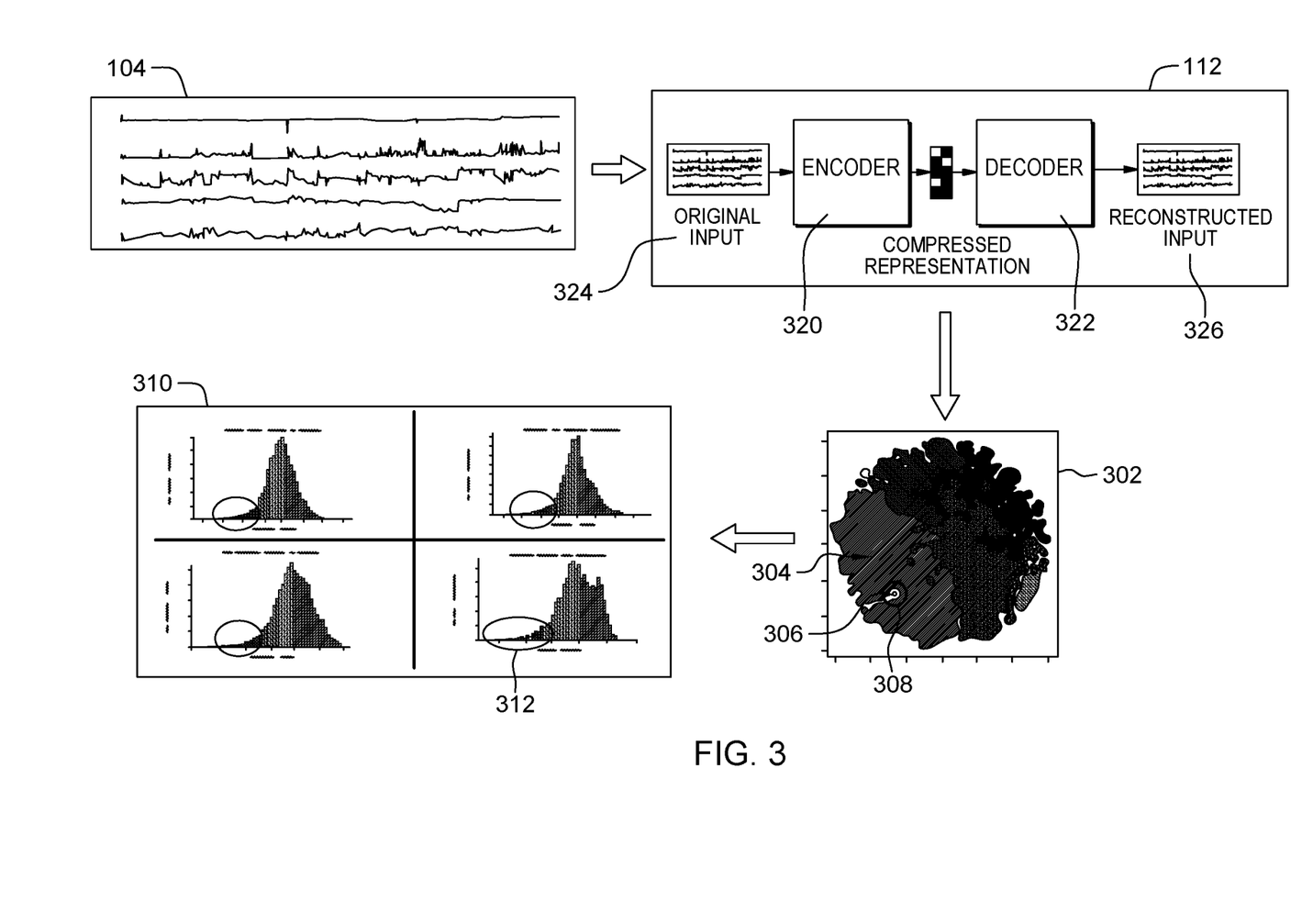
FIG. 3 illustrates an exemplary functional diagram of the opportunity discovery module within the computing device of FIG. 1, in accordance with an embodiment of the present disclosure.

FIG. 3 illustrates an exemplary functional diagram of opportunity discovery module 110 in accordance with one or more embodiments of the present disclosure.

In the example of FIG. 3, opportunity discovery module 110 may achieve opportunity realization through analysis using unsupervised machine learning. An operational opportunity may be identified through the comparison of the current state (or scenario) with the historical similar episodes inside a mode or neighborhood. Opportunity discovery module 110 may monitor operation as time series data 104 from sensors. Opportunity discovery module 110 may apply LSTM auto-encoder 112 to extract the feature of time series data 104 into an embedded space. LSTM auto-encoder 112 may achieve the time-series representation learning with dimensional reduction. LSTM auto-encoder 112 may learn a representation (encoding) for time series data 104, e.g., for dimensionality reduction. LSTM auto-encoder 112 may generate from the reduced encoding a representation as close as possible to the original input of time series data 104. In the depicted embodiment, LSTM auto-encoder 112 includes encoder 320 and decoder 322. Encoder 320 may take original input 324 (e.g., time series data 104) as input and may produce feature or representation as output. Decoder 322 may use the extracted feature from encoder 320 as input and may reconstruct original input 324 into reconstructed input 326 as output. Opportunity discovery module 110 may identify one or more static operational modes 302 (e.g., mode 304) using Gaussian mixture clustering applied to the embedded space. Opportunity discovery module 110 may project the clusters using t-SNE compression to generate graph of modes 302. Modes 302 may be used as a benchmark against which the system may determine if similar production conditions have been present in the past. Modes 302 may be used to recommend better control actions or to automatically change control parameters. Opportunity discovery module 110 may identify a dynamic mode (e.g., neighborhood 308) for current operational state 306 using the embedded space. Opportunity discovery module 110 may discover operational opportunities depending on, e.g., operational mode 304 or neighborhood 308. In an example, opportunity discovery module 110 may limit historical episodes by selecting neighborhood 308 of current operational state 306 using the embedded space. Neighborhood 308 may be found through Euclidean distances between historical episodes and current state 306 defined at the feature space. Block 310 demonstrates opportunity realization by comparing the current operational state with other operations located at the same mode, e.g., mode 304. An operation opportunity is demonstrated in opportunity window 312 as poor episodes with poor performance may indicate an opportunity to improve.

Figure 4:
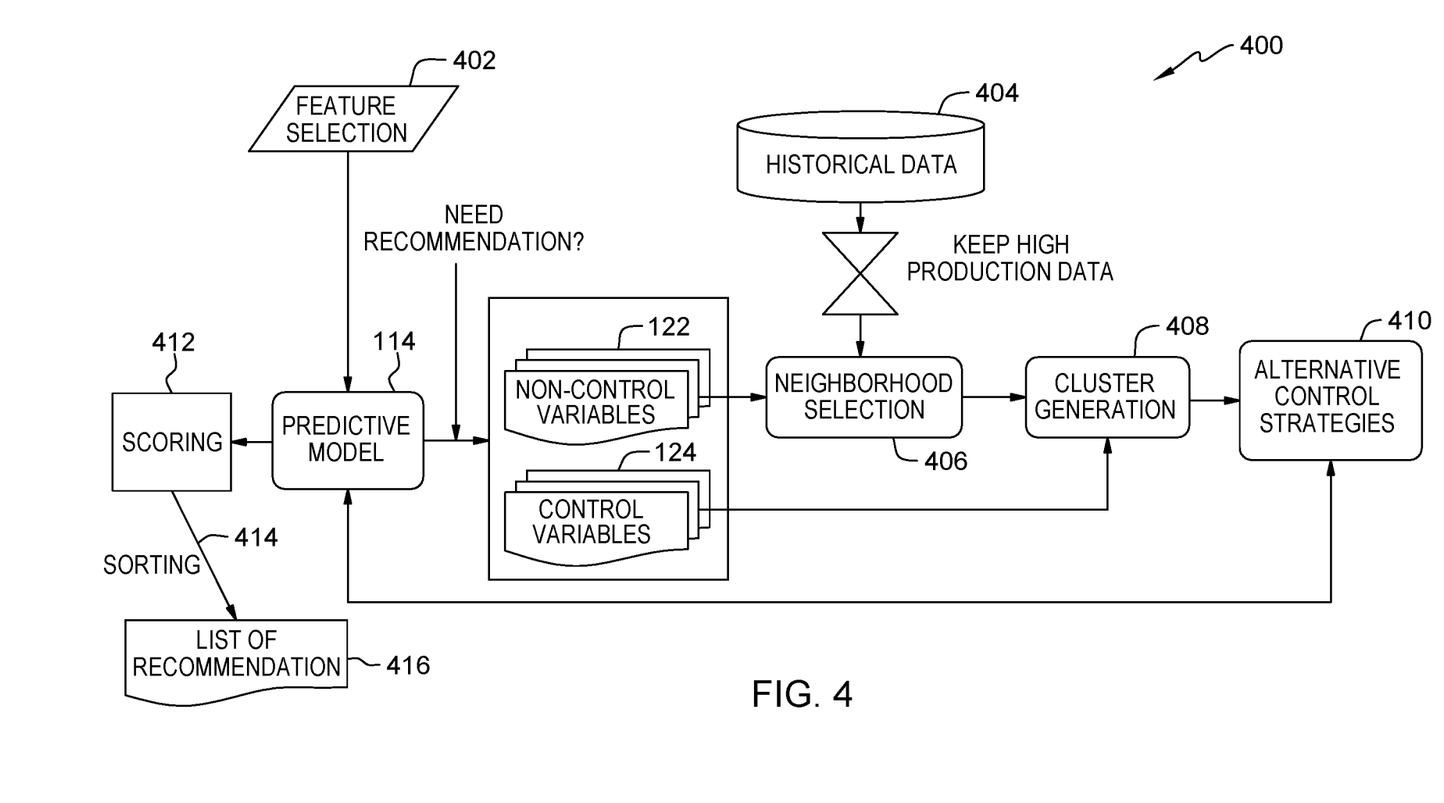
FIG. 4 illustrates an exemplary architecture diagram of the opportunity discovery module within the computing device of FIG. 1, in accordance with an embodiment of the present disclosure.

FIG. 4 illustrates an exemplary architecture diagram of opportunity discovery module 110 in accordance with one or more embodiments of the present disclosure.

In block 402, a set of features can be selected to create prediction model 114 based on historical data 404, e.g., time series data 104. Prediction model 114 may identify a potential manufacture gain from less usage of raw materials or additives without reducing production, or production increase of intermediate or final products with a same usage of raw materials or additives. Prediction model 114 may predict potentials of less productive usage of raw materials or additives or productivity increase with a same usage of raw materials or additives. Prediction model 114 may invoke opportunity identifying algorithms to identify alternative operations to gain opportunities. Historical data 404 may be data captured by one or more sensors. In an example, historical data 404 can be data from an oil sand operation and production process. In another example, historical data 404 can be data from a steelmaking process of producing steel from iron ore and/or scrap. In yet another example, historical data 404 can be data from any other suitable operation and production process. Prediction model 114 can be verified using control variables 124 and non-control variables 122. Prediction model 114 may use non-control variables 122 (e.g., environmental variables that a user has little or no control) to retrieve episodes from historical data 404 by neighborhood selection 406. Prediction model 114 may use control variables 124 (e.g., action variables that a user may control or change in the process) to calculate the rewards (or opportunities) from the episodes of historical data 404 with cluster generation 408. Cluster generation 408 may group a set of objects from historical data 404 in such a way that objects in the same group (called a cluster) are more similar (in some sense) to each other than to those in other groups (clusters).

Alternative control strategies 410 can be action strategies to select proper actions and change the environments to realize a final opportunity. Alternative control strategies 410 may allow a user or a plan manager to gain a real time support for decision-making for increasing productivity. For example, predictive model 114 may provide scoring 412 and perform sorting 414 for list of recommendation 416 to a user. In an example, a user interface over a portable device may be provided for a user. List of recommendation 416 of potential targeted quantities may be selected, e.g., from raw material, intermediate and final products, or expensive additives.

Figure 5:
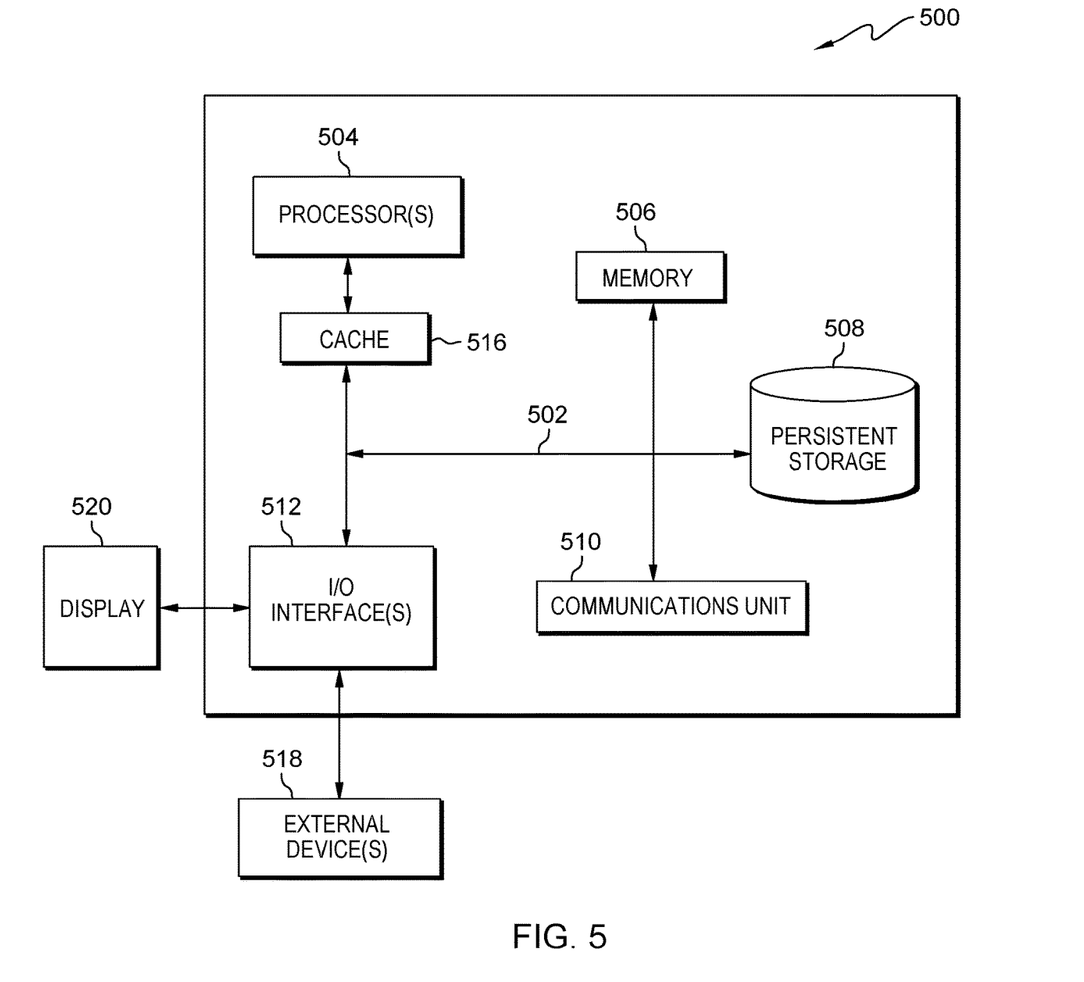
FIG. 5 is a block diagram of components of the computing device of FIG. 1, in accordance with an embodiment of the present disclosure.

FIG. 5 depicts a block diagram 500 of components of computing device 102 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environment may be made.

Computing device 102 may include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Opportunity discovery module 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Opportunity discovery module 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., opportunity discovery module 110 can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:
1. A computer-implemented method comprising:
extracting, by one or more processors, a set of features from time series data generated from one or more sensors, through autoencoding using a neural network, based on one or more non-control variables for the time series data, the one or more non-control variables defining a lack of control by a user on the time series data;

monitoring, by one or more processors, the time series data generated from the one or more sensors;

identifying, by one or more processors, one or more operational modes based on the extracted features including a dimensional reduction with a representation learning from the time series data;

identifying, by one or more processors, a neighborhood of a current operational state based on the extracted features, the neighborhood being a dynamic mode within a same operational mode;

comparing, by one or more processors, the current operational state to one or more historical operational states based on the time series data at the same operational mode of the one or more operational modes;

discovering, by one or more processors, an operational opportunity based on the comparison of the current operational state to the one or more historical operational states using the neighborhood;

identifying, by one or more processors, one or more control variables in the same mode which variables are relevant to the current operational state, the one or more control variables defining actions that can be controlled by the user; and recommending, by one or more processors, an action strategy based on the one or more control variables, the one or more non-control variables, and a target productivity.

2. The computer-implemented method of claim 1, wherein the neural network is a long short-term memory auto-encoder.

3. The computer-implemented method of claim 1, wherein discovering the
operational opportunity is based on the comparison of the current operational state to the one or more historical operational states using the mode.

4. The computer-implemented method of claim 1, wherein the operational opportunity is selected from the group consisting of: a set of operational changes deduced from the one or more historical operational state to increase the current operational state into a higher production in a defined short-term future period, and a set of operational changes deduced from the historical operational state to reduce the current operational state into a low usage of additives or raw materials in a defined short-term future period.

5. The computer-implemented method of claim 1, further comprising:
defining, by one or more processors, a similarity measurement to identify historical episodes from the time series data, with a similar operational state based on the comparison of the current state with the one or more historical operational states; and
creating, by one or more processors, an episode from the historical episodes that demonstrates a selection from the group consisting of: higher productivity and throughput.

6. The computer-implemented method of claim 1, further comprising
outputting the action strategy, the outputting comprising:
providing an alert to the user for the operational opportunity,
displaying the one or more operational modes using a t-distributed stochastic neighbor embedding method,
displaying a neighborhood episode using a time-stamped chart, and
displaying an estimated gain of the action strategy.

7. A computer program product comprising:
one or more computer readable storage media, and program instructions collectively stored on the one or more computer readable storage media, the program instructions comprising:
program instructions to extract a set of features from time series data generated from one or more sensors, through autoencoding using a neural network, based on one or more non-control variables for the time series data, the one or more non-control variables defining a lack of control by a user on the time series data;
program instructions to monitor the time series data generated from the one or more sensors;
program instructions to identify one or more operational modes based on the extracted features including a dimensional reduction with a representation learning from the time series data;
program instructions to identify a neighborhood of a current operational state based on the extracted features according to distances between the current operational state and one or more historical operational states, the neighborhood being a dynamic mode within a same operational mode;
program instructions to compare the current operational state to the historical operational states based on the time series data at the same operational mode of the one or more operational modes;
program instructions to discover an operational opportunity based on the comparison of the current operational state to the historical operational states using the neighborhood;
program instructions to identify one or more control variables in the same mode which variables are relevant to the current operational state, the one or more control variables defining actions that can be controlled by the user; and
program instructions to recommend an action strategy based on the one or more control variables, the one or more non-control variables, and a target productivity.

8. The computer program product of claim 7, wherein the neural network is a long short-term memory auto-encoder.

9. The computer program product of claim 7, wherein program instructions to discover the operational opportunity based on the comparison of the current operational state to the one or more historical operational states using the mode.

10. The computer program product of claim 7, wherein the operational opportunity is selected from the group consisting of: a set of operational changes deduced from the one or more historical operational states to increase the current operational state into a higher production in a defined short-term future period, and a set of operational changes deduced from the one or more historical operational states to reduce the current operational state into a low usage of additives or raw materials in a defined short-term future period.

11. The computer program product of claim 7, further comprising:
program instructions, stored on the one or more computer-readable storage media, to define a similarity measurement to identify historical episodes from the time series data, with a similar operational state based on the comparison of the current state with the one or more historical operational states; and program instructions, stored on the one or more computer-readable storage media, to create an episode from the historical episodes that demonstrates a selection from the group consisting of: higher productivity and throughput.

12. The computer program product of claim 7, further comprising:

program instructions, stored on the one or more computer-readable storage media, to output the action strategy, wherein program instructions to output comprise program instructions:

to provide an alert to the user for the operational opportunity, to display the one or more operational modes using a t-distributed stochastic neighbor embedding method, to display a neighborhood episode using a time-stamped chart, and to display an estimated gain of the action strategy.

13. A computer system comprising:

one or more computer processors, one or more computer readable storage media, and program instructions stored on the one or more computer readable storage media for execution by at least one of the one or more computer processors, the program instructions comprising:

program instructions to extract a set of features from time series data generated from one or more sensors, through autoencoding using a neural network, based on one or more non-control variables for the time series data, the one or more non-control variables defining a lack of control by a user on the time series data;

program instructions to monitor the time series data generated from the one or more sensors;

program instructions to identify one or more operational modes based on the extracted features including a dimensional reduction with a representation learning from the time series data;

program instructions to identify a neighborhood of a current operational state based on the extracted features according to distances between the current operational state and one or more historical operational states, the neighborhood being a dynamic mode within a same operational mode;

program instructions to compare the current operational state to the historical operational states based on the time series data at the same operational mode of the one or more operational modes;

program instructions to discover an operational opportunity based on the comparison of the current operational state to the historical operational states using the neighborhood;

program instructions to identify one or more control variables in the same mode which variables are relevant to the current operational state, the one or more control variables defining actions that can be controlled by the user; and program instructions to recommend an action strategy based on the one or more control variables, the one or more non-control variables, and a target productivity.

14. The computer system of claim 13, further comprising:

program instructions, stored on the one or more computer-readable storage media, to monitor the time series data generated from the one or more sensors.

15. The computer system of claim 13, wherein the neural network is a long short-term memory auto-encoder.

16. The computer system of claim 13, wherein program instructions to discover the operational opportunity based on the comparison of the current operational state to the one or more historical operational states using the mode.

17. The computer system of claim 13, wherein the operational opportunity is selected from the group consisting of: a set of operational changes deduced from the one or more historical operational states to increase the current operational state into a higher production in a defined short-term future period, and a set of operational changes deduced from the one or more historical operational states to reduce the current operational state into a low usage of additives or raw materials in a defined short-term future period.

18. The computer system of claim 13, further comprising:

program instructions, stored on the one or more computer-readable storage media, to output the action strategy, wherein program instructions to output comprise program instructions:

to provide an alert to the user for the operational opportunity, to display the one or more operational modes using a t-distributed stochastic neighbor embedding method, to display a neighborhood episode using a time-stamped chart, and to display an estimated gain of the action strategy.

* * * * *